Dec. 11, 1956  J. E. COTTLE  2,773,559
HIGH PRESSURE STABILIZATION OF OILS
Filed Dec. 4, 1953
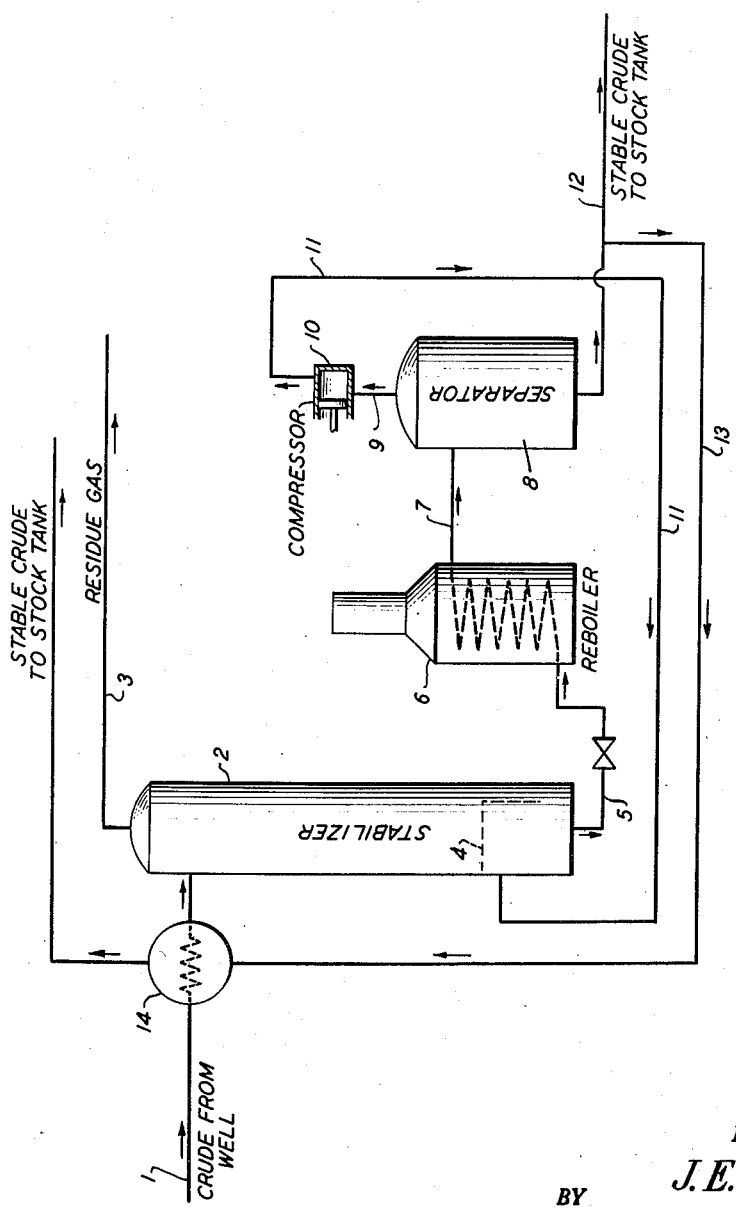
INVENTOR.
J. E. Cottle
BY
Hudson & Young
ATTORNEYS › # United States Patent Office

2,773,559
Patented Dec. 11, 1956

2,773,559

HIGH PRESSURE STABILIZATION OF OILS

John E. Cottle, Bartlesville, Okla., assignor to Phillips Petroleum Company, a corporation of Delaware Application December 4, 1953, Serial No. 396,235

12 Claims. (Cl. 183—114.5)

The invention relates to the degassing of oils, for example, crude oils and the like. In one aspect, the invention provides the removal of gas contained in a liquid under pressure employing heat from hot gases already separated from said liquid at a pressure substantially lower than that originally upon said liquid. In another aspect, the invention provides separating a gas contained in an oil under pressure by reducing the pressure on said oil and then heating said oil, thus avoiding disadvantageous results, as explained herein.

According to the invention, oil from a well or other supply source containing gas and under a relatively high pressure is treated to separate said gas therefrom in a stabilizing or gas-separating zone maintained under said pressure, heat to said zone being supplied as follows: removing from said zone liquid oil containing gas, heating said oil under substantially lower pressure than that which prevails in said zone, passing said heated oil to a vapor-liquid separation zone, removing liquid stabilized oil from said separation zone, removing flashed gases from said zone, compressing at least a portion of said gases to a pressure sufficient to cause said gases to enter into said stabilizing zone, and returning said gases to said stabilizing zone, thus obtaining degasification at high pressure but heating liquid in the process, to supply heat to the process, at reduced pressure.

The invention will now be further described with special reference to the stabilization of crude oils, it being understood that other oils or liquids can be treated according to the method or procedure of the present invention.

As obtained from the usual oil well, oil containing gas is under a pressure which is desirably retained to avoid having to supply additional pressure to transport gases which are removed therefrom. This has led to the so-called high pressure fractionation of the crude oil to permit transport of the overhead gaseous hydrocarbons to their destination without further compression in the field. In this process the crude must be heated to 500° F. or more to obtain the necessary column boil-up and to reduce the crude to the low vapor pressure thereof which is required to be reached to properly degasify the same. Crude cracking and fouling of equipment can result at such temperatures. This is due to the fact that crudes are easily cracked at said temperatures especially in the presence of impurities which may be contained therein. It is, of course, desirable also to avoid pressure reduction upon crudes containing gases because at lower pressures there will be suffered a loss of valuable light hydrocarbons.

Low pressure fractionation is one method for the degassing or the stabilization of crude oils containing gases. However, this, as noted, results in the necessary compression of large volumes of gases before the gases can be moved in a pipe-line, for example.

According to this invention a stabilizer is operated at whatever desirable high pressure the crude oil containing the gases desired to be removed is obtained in the field. However, a low temperature is employed in the stabilizer relative to that which has been employed heretofore in the high pressure method to which reference has been made. Therefore, as one feature of the present invention, the oil is not heated to any of the temperatures heretofore mentioned. Yet, the desired degasification is accomplished by removing from the stabilizer a liquid bottoms or other liquid stream, reducing the pressure thereto, say, 100–175 p. s. i. g., heating the same to a temperature in the neighborhood of, say, 325–375 or, say, up to 400 or 450° F., in a stabilizer operated at a pressure of about 150–450 or up to about 500 p. s. i. g., and then passing said oil to a vapor-liquid separator at a pressure of about 100 to about 175 p. s. i. g. so as to recover a gaseous fraction and a stabilized liquid fraction; the gaseous fraction, still at an elevated temperature is compressed and returned to the stabilizer. Ultimately, in operation, only a small proportion of gas remains in the bottoms of the stabilizer which are heated by the returned gases and, therefore, only a small quantity of gases need be recompressed to pressure following the pressure reduction, heating, and vapor separation practiced upon said bottoms. Thus it is that according to the invention the required bottoms temperature is substantially reduced, residue gas is still available at the desired pressure and crude cracking and/or fouling is eliminated.

It will be understood that the conditions of temperature and pressure are not critical to the invention or modus operandi herein set forth in the sense that given the said modus operandi one skilled in the art can, for each liquid to be degassed, select optimum conditions. Thus, the invention is essentially in the combination of the steps set forth herein, and in the drawing; in the relatively lower temperatures which can be employed in the stabilizer, the manner of imparting heat to said stabilizer, in the flashing of gases, retained in the removed liquid bottoms of said stabilizer, at a pressure lower than that prevailing in said stabilizer, upon pressure reduction and upon the imparting of heat to said liquid, and in the compression and return of the gases, thus obtained, to said stabilizer in a manner to impart heat to the liquid therein.

In the drawing there is shown a schematic diagram of the essential steps of the invention in one embodiment thereof.

Referring now to the drawing, a crude oil containing gases and at a pressure of approximately 325 pounds per square inch gauge is introduced by way of conduit 1 into a stabilizer or fractionating column 2. The pressure in column 2 is about 300 pounds per square inch gauge. Owing to the pressure reduction and to the presence of heat in the column, some gases are released from the oil and these gases passed through conduit 3 to the residue gas main or other transport line. A liquid collecting on tray 4 is removed through valved line 5 and passed through reboiler 6 which contains an elongated heating coil, zone or passageway in which it is heated to about 350° F. whence it is passed through conduit 7 into separator 8. Passing through the valve in line 5, the pressure of the oil is considerably reduced causing separation of gases from the liquid phase. Separator 8 is operated at a pressure of about 150 pounds per square inch gauge. The temperature in separator 8 will be somewhat lower than in conduit 7 in view of the absorption of heat by additional gas separation occurring therein. Separated gases are taken overhead by way of conduit 9, compressed by compressor 10 and forced through conduit 11 into the bottom of stabilizer column 2. The gases forced into the bottom of column 2 by way of conduit 11 are at a temperature sufficiently elevated to cause column 2 to function. Therefore, in column 2, as already noted, gases are separated from the crude oil. It is to be noted that all gases separated from the crude oil in the operation of the method of the drawing ultimately pass from the operation or system by way of conduit 3. Stabilized crude oil is withdrawn from separator 8 by way of conduit 12 and passed to suitable crude oil storage or transport means, or it can be passed into indirect heat exchange relationship with incoming fresh crude, by means of conduit 13 and exchanger 14, as shown, and then passed to storage. By positioning the valve in line 5, that is, ahead of the heater, increased velocity of flow in the heater, due to increased volume of gases or vapors, is obtained.

It is within the scope of the invention to reduce the pressure following reboiler 6 or to reduce the pressure in part before reboiler 6 and then further after said reboiler. Respecting the temperatures and pressures herein, it is to be noted that for any given temperature there is a corresponding vapor-liquid equilibrium. Therefore, choice of pressure can be employed to establish the desired temperature at any point in the system.

In the table by way of specific example which follows, there is shown a recovery of 316 barrels per day of crude oil over an existing two-stage flash system in which the pressures were, respectively, 14 p. s. i. g. and 0 p. s. i. g. Thus, in the latter system, operating on the same feed, 2834 barrels per day were recovered whereas in the example, 3150 barrels per day are recovered. The operating conditions in the example are: in column 2, 300 p. s. i. g. and a bottom temperature of about 240° F. and in separator 8, 150 p. s. i. g. and a top or vapor temperature of about 350° F.

TABLE

|  | Crude to Column | | Gas | | Stabilizer Crude | |
| --- | --- | --- | --- | --- | --- | --- |
|  | Moles/D. | Gal./D. | Moles/D. | MSCE/D. | Moles/D. | Gal./D. |
| $N_2$ | 112 |  | 112 | 42 |  |  |
| $C_1$ | 2,140 | 13,700 | 2,140 | 811 |  |  |
| $C_2$ | 618 | 5,950 | 616 | 234 | 2 | 20 |
| $C_3$ | 845 | 8,750 | 520 | 197 | 325 | 3,370 |
| $C_4$ | 683 | 8,200 | 71 | 27 | 612 | 7,350 |
| $C_5$ | 563 | 7,750 | 18 | 7 | 545 | 7,500 |
| $C_6$ | 488 | 7,640 | 6 | 2 | 482 | 7,550 |
| $C_7+$ | 3,502 | 106,800 | 4 | 2 | 3,498 | 106,680 |
| Total | 8,951 | 158,790 | 3,487 | 1,322 | 5,464 | 132,470 |
| Bbl./D. |  | 3,780 |  |  |  | 3,150 |

Stabilization at 300 p. s. i. g. in the existing system would require a kettle temperature of about 520° F.

The range of pressure conditions in the present invention are: 75–500 p. s. i. g. in the stabilizer and 25–200 p. s. i. g. in the separator.

From the description of the operation of the system shown in the drawing, it will be clear to one skilled in the art that only a small quantity of gas which is not removed by virtue of the lower temperature in the bottom of stabilizer column 2 is heated in reboiler 6 and removed in separator 8. Also only this small quantity of gas need be compressed in compressor 10. The advantages of operating according to the system in the drawing are manifold as already noted. Thus, the advantages of high pressure fractionation and low temperature heating are both retained by operating according to the system.

Reasonable variation and modification are possible within the scope of the foregoing disclosure, drawing and the appended claims to the invention, the essence of which is that gases to be removed from a crude oil containing the same at a pressure substantially above atmospheric are removed from said crude oil by supplying the same to a fractionator or stabilizer column operated at a temperature below a cracking or fouling temperature, said gases are fractionated as far as possible from said oil in said stabilizer, the said oil following said separation of gases therefrom is removed from said stabilizer and is heated to a moderately elevated temperature still below a cracking or fouling temperature, gases formed are separated at a substantially lower pressure to obtain a stabilized crude, and said separated gases at said lower pressure are then compressed and while still hot forced back into the said stabilizer to impart at least a portion of the heat required in said stabilizer to the contents thereof; and that, preferably, at least a part of the said substantially lower pressure upon said oil is attained before said oil separated from said stabilizer is heated.

I claim:

1. The degasification of a liquid which comprises passing said liquid containing gases into a degasifying zone under an elevated pressure and therein heating said liquid to a moderately elevated temperature such that said liquid is not chemically altered, removing some gases from said liquid in said zone, removing liquid still containing a substantial portion of gases from said zone and in a separate heating zone heating said liquid while maintaining intimately together all of said gases and all of said liquid at a pressure lower than that prevailing in said degasifying zone to a higher temperature than in said degasifying zone but still below a temperature at which said liquid is chemically altered, then in a still further and separate zone separating gases from said liquid at a substantially reduced pressure so as to obtain a degassed liquid and gases still at an elevated temperature, increasing the pressure of said gases and returning said gases to said zone, the said gases which are intimately maintained together with said liquid permitting heating said liquid without undesirable decomposition to temperatures substantially exceeding those to which said liquid can be heated in the absence of said gases.

2. A method according to claim 1 wherein the pressure on the said liquid is reduced to a substantial extent before it is heated.

3. A method according to claim 2 wherein the liquid to be degasified is a crude oil containing hydrocarbon gases.

4. The degasification of a hydrocarbon oil containing hydrocarbon gases under pressure which comprises passing said oil containing gases into said degasifying zone maintained under an elevated pressure, therein heating said oil to a moderately elevated temperature so that said oil is not chemically altered, removing some gases from said oil in said degasifying zone, removing oil still containing a substantial proportion of gases from degasifying zone, in a separate heating zone heating said removed oil while maintaining intimately together all of said gases and all of said oil at a pressure lower than that prevailing in said degasifying zone to a higher temperature than that at which it is heated in said degasifying zone but to a temperature which is still below a temperature at which said oil is chemically altered, then in a still further and separate zone separating said gases from said oil at substantially reduced pressure so as to obtain a degassed oil and gases still at an elevated temperature, increasing the pressure of said gases and returning said gases at a temperature higher than that prevailing in said degasifying zone to said degasifying zone, thus to impart at least a portion of the heat required in said degasifying zone, the said gases which are intimately maintained together with said oil permitting heating said oil without undesirable decomposition to temperatures substantially exceeding those to which said oil can be heated in the absence of said gases.

5. A method according to claim 4 wherein the pressure upon said oil withdrawn from said degasifying zone is substantially reduced before it is heated to said higher temperature.

6. The degasification of a liquid which comprises passing said liquid containing gases into a degasifying zone under an elevated pressure and there heating said liquid to a moderately elevated temperature such that said liquid is not chemically altered, removing some gases from said liquid in said zone, removing liquid still containing a substantial proportion of gases from said zone, expanding said gases in said removed liquid while maintaining intimately together all of said gases and all of said liquid by reducing the pressure thereon, and heating said liquid in a separate heating zone while still maintaining intimately together all of said gases and all of said liquid at the said reduced pressure to a higher temperature than prevailing in said degasifying zone, but still below a temperature at which said liquid is chemically altered, then in a still further and separate zone separating gases from said liquid at a substantially reduced pressure so as to obtain a degassed liquid and gases still at an elevated temperature, increasing the pressure of said gases and returning at least a portion of said gases to said degasifying zone to supply the required heat therein, the said gases which are intimately maintained together with said liquid permitting heating said liquid without undesirable decomposition to temperatures substantially exceeding those to which said liquid can be heated in the absence of said gases.

7. The degasification of a crude hydrocarbon oil containing hydrocarbon gases under well production pressure which comprises passing said oil from the well into a degasifying zone maintained substantially at a high production pressure, removing gases from said zone substantially at the production pressure which is maintained therein, removing from said zone liquid oil containing a substantial proportion of gas, heating said oil in a separate heating zone while maintaining intimately together all of said gas and all of said oil under substantially lower pressure than that which prevails in said degasifying zone, passing said heated oil to a still further and separate vapor-liquid separation zone, removing liquid stabilized oil from said separation zone, removing flashed gases from said zone, compressing at least a portion of said gases to a pressure sufficient to cause said gases to enter into said stabilizing zone, and returning said gases to said stabilizing zone thus obtaining degasification at high pressure but heating liquid in the process, to supply heat to the process, at reduced pressure, the said gas which is intimately maintained together with said oil permitting heating said oil without undesirable decomposition to temperatures substantially exceeding those to which said liquid can be heated in the absence of said gas.

8. The degasification of a crude oil which is subject to decomposition at a degasifying temperature at the pressures at which it is produced employing high pressure fractionation which comprises passing said oil into a degasifying zone, heating and maintaining said oil in said zone at a temperature of approximately 300° F., at a pressure of approximately 150–500 pounds per square inch gauge, removing from said zone gases separated from said oil in said zone, removing liquid oil containing a substantial proportion of gases from said zone, reducing the pressure of said liquid oil to a pressure of approximately 100–175 pounds per square inch gauge— lower pressures in the latter range applying when lower pressures in the former range apply and vice versa, heating in a separate heating zone while maintaining intimately together all of said gases and all of said oil in said removed oil to a temperature in the approximate range 325° F.–400° F., flashing in a still further and separate zone said thus heated oil to obtain a degassed oil and gases still at an elevated temperature which is substantially higher than that of the oil in said degasifying zone, increasing the pressure of at least a portion of said gases, and returning said gases to said degasifying zone to supply heat thereto required to degasify the oil therein, thus recovering gases from said crude oil at substantially the well pressures without heating the oil at said production pressures, the said gases which are intimately maintained together with said oil permitting heating said oil without undesirable decomposition to temperatures substantially exceeding those to which said liquid can be heated in the absence of said gases.

9. A method for the separation of gases from a crude oil from a well or other supply source containing gas under a relatively high pressure of the order of 300 pounds per square inch gauge to separate said gas therefrom in a high pressure stabilizing degasifying zone which comprises the steps in combination of maintaining said oil in said zone at a temperature of approximately 240° F., and at a pressure of 300 pounds per square inch gauge, removing from said zone gases which are generated from said oil therein, removing at least a portion of liquid oil containing a substantial proportion of gases from said zone, reducing the pressure upon said liquid oil removed from said zone to approximately 150 pounds per square inch gauge thus expanding the gases in said liquid oil, then increasing the temperature of said removed oil while maintaining intimately together all of said gases and all of said liquid oil by heating said gases and oil in a separate heating zone, then in a still further and separate zone separating gases thus formed from said oil, removing said degasified oil from the system, compressing at least a portion of the gases thus separated to a pressure sufficiently above 300 pounds per square inch gauge to enable return of gases to said stabilizing zone, and returning at least a portion of said gases which are still hot to said stabilizing zone to impart heat required in the method to the oil in said stabilizing zone, the said gases which are intimately maintained together with said oil permitting heating said oil wthiout undesirable decomposition to temperatures substantially exceeding those to which said liquid can be heated in the absence of said gases.

10. The degasification of a liquid which comprises passing said liquid containing gases into a degasifying zone under an elevated pressure and therein heating said liquid to a moderately elevated temperature such that said liquid is not chemically altered, removing some gases from said liquid in said zone, removing liquid still containing a substantial proportion of gases from said degasifying zone and then in a separate heating zone heating said liquid while maintaining intimately together all of said gases and all of said liquid in a separate elongated heating zone to a higher temperature than in said zone but still below a temperature at which said liquid is chemically altered, then in a still further and separate zone separating gases from said liquid at a substantially reduced pressure so as to obtain a degassed liquid and gases still at an elevated temperature, increasing the pressure of said gases and returning said gases to said zone, the said gases which are intimately maintained together with said liquid, during its heating in said elongated heating zone, permitting heating said liquid without undesirable decomposition to temperatures substantially exceeding those to which said liquid can be heated in the absence of said gases.

11. The degasification of a hydrocarbon oil containing hydrocarbon gases under pressure which comprises passing said oil containing gases into said degasifying zone maintained at a pressure in the approximate range 75–500 pounds per square inch gauge, therein heating said oil to a moderately elevated temperature so that said oil is not chemically altered, removing some gases from said oil in said degasifying zone, removing oil still containing a substantial proportion of gases from said degasifying zone, in a separate heating zone heating said removed oil while maintaining intimately together all of said gases and all of said oil at a pressure lower than that prevailing in said degasifying zone and in the approximate range 25–200 pounds per square inch gauge to a higher temperature than that at which it is heated in said degasifying zone but to a temperature which is still below a temperature at which said oil is chemically altered, in a still further and separate zone separating said gases from said oil at a substantially reduced pressure so as to obtain a degassed oil and gases still at an elevated temperature, increasing the pressure of said gases and returning said gases at a temperature higher than that prevailing in said degasifying zone to said degasifying zone, thus to impart at least a portion of the heat required in said degasifying zone, the said gases which are intimately maintained together with said oil permitting heating said oil without undesirable decomposition to temperatures substantially exceeding those to which said oil can be heated in the absence of said gases.

12. The degasification of a liquid which comprises passing said liquid containing gases into a degasifying zone under an elevated pressure and therein heating said liquid to a moderately elevated temperature such that said liquid is not chemically altered, removing some gases from said liquid in said zone, removing liquid still containing a substantial proportion of gases from said degasifying zone, expanding the said gases in said removed liquid by reducing the pressure thereon, heating in a separate heating zone said removed liquid while it contains said expanded gases therein and while all of said expanded gases and all of said liquid are maintained intimately together, the pressure of which has been reduced, in a separate elongated heating zone to a higher temperature than in said degasifying zone but still below a temperature at which said liquid is chemically altered, then in a further and separate zone separating gases from said liquid so as to obtain a degassed liquid and gases still at an elevated temperature, increasing the pressure of at least a portion of said separated gases and returning said gases to said degasifying zone, the said gases, which in said heating zone are maintained intimately together with said liquid, permitting heating said liquid without undesirable decomposition to temperatures substantially exceeding those to which said liquid can be heated in the absence of said gases.

References Cited in the file of this patent

UNITED STATES PATENTS

| | | |
|---|---|---|
| 1,954,101 | Roberts et al. | Apr. 10, 1934 |
| 2,249,884 | Carney | July 22, 1941 |
| 2,301,520 | Carney | Nov. 10, 1942 |
| 2,303,609 | Carney | Dec. 1, 1942 |